United States Patent [19]
Allan

[11] Patent Number: 5,179,767
[45] Date of Patent: * Jan. 19, 1993

[54] CONNECTOR APPARATUS

[76] Inventor: Robert M. Allan, 1631 Colgate Cir., La Jolla, Calif. 92037

[*] Notice: The portion of the term of this patent subsequent to Feb. 18, 2009 has been disclaimed.

[21] Appl. No.: 787,424

[22] Filed: Nov. 12, 1991

Related U.S. Application Data

[63] Continuation-in-part of Ser. No. 553,258, Jul. 16, 1990, Pat. No. 5,088,162.

[51] Int. Cl.$^5$ .............................................. A44B 18/00
[52] U.S. Cl. ......................................... 24/442; 24/306; 24/587; 383/63
[58] Field of Search .................. 24/442, 446, 449, 450, 24/451, 452, 304, 306, 16 PB, 17 AP, 30.5 P, 587, 265 C, 712.5, 713.2, 713.3, 714, 633, 634; 383/63, 65

[56] References Cited

U.S. PATENT DOCUMENTS

| | | |
|---|---|---|
| 14,762 | 11/1919 | Springer . |
| Re. 24,613 | 3/1959 | Hageltorn ............................ 24/587 |
| 410,447 | 9/1889 | Rich . |
| 495,775 | 4/1893 | Bonnamy . |
| 772,412 | 10/1904 | Garrett et al. . |
| 983,093 | 1/1911 | Svenson . |
| 1,330,737 | 2/1920 | Coffman . |
| 1,751,926 | 3/1930 | Kielberg . |
| 1,912,180 | 5/1933 | Cornell . |
| 2,144,755 | 1/1939 | Freedman . |
| 2,249,764 | 7/1941 | Hothersall . |
| 2,499,898 | 3/1950 | Anderson . |
| 2,693,875 | 11/1954 | Chaffee . |
| 2,766,814 | 10/1956 | Sedlacek . |
| 2,841,850 | 7/1958 | Zahorski . |
| 2,979,119 | 4/1961 | Kramer . |
| 2,994,117 | 8/1961 | McMullin . |
| 3,009,235 | 11/1961 | Mestral . |
| 3,015,869 | 1/1962 | Rapata . |
| 3,020,613 | 2/1962 | Morin . |
| 3,038,225 | 6/1962 | Ausnit .................................. 24/587 |
| 3,066,366 | 12/1962 | Wyckoff et al. . |
| 3,078,532 | 2/1963 | Bywater . |
| 3,083,737 | 4/1963 | De Mestral . |
| 3,101,517 | 8/1963 | Fox et al. . |
| 3,141,221 | 7/1964 | Faulls, Jr. . |
| 3,192,589 | 7/1965 | Pearson . |
| 3,247,848 | 4/1966 | Mathison . |
| 3,263,292 | 8/1966 | Fekete . |
| 3,266,113 | 8/1966 | Flanagan, Jr. . |
| 3,338,285 | 8/1967 | Jaster . |
| 3,347,298 | 10/1967 | Ausnit et al. . |
| 3,353,662 | 11/1967 | Pickin . |
| 3,364,530 | 1/1968 | Kraus . |
| 3,372,442 | 3/1968 | Ishimatsu ............................ 24/587 |
| 3,403,429 | 10/1968 | Smith . |
| 3,408,705 | 11/1968 | Kayser et al. . |

(List continued on next page.)

FOREIGN PATENT DOCUMENTS

| | | |
|---|---|---|
| 2213686 | 10/1972 | Fed. Rep. of Germany . |
| 1232367 | 10/1960 | France . |
| 376328 | 5/1964 | Switzerland . |
| 898124 | 6/1962 | United Kingdom . |
| 1078193 | 8/1967 | United Kingdom ............ 24/304 |
| 1161406 | 8/1969 | United Kingdom ............ 24/306 |

Primary Examiner—Victor N. Sakran
Attorney, Agent, or Firm—William W. Haefliger

[57] ABSTRACT

A connector comprising a body having generally flexible, C-shaped cross section structure defining recess structure in planes crosswise of and normal to a major dimension of the body; the body having a base and a succession of side walls together defining the C-shaped recess structure, each side wall having a mid-section and an outer side wall portion, the mid-section being sufficiently narrow to allow the upper side wall portion to flex; the side walls having inverted C-shaped termini relative to the C-shaped recess structure; and a ridge structure configured to nest in and be gripped by the side walls of certain of the recess structure; and wherein the ridge structure is fitted in the certain C-shaped recess structure to form the connector; and including structure to confirm complete adjusted interlock of the ridge structure in the certain C-shaped recess structure.

39 Claims, 6 Drawing Sheets

U.S. PATENT DOCUMENTS

| | | | |
|---|---|---|---|
| 3,410,327 | 11/1968 | Ausnit . | |
| 3,416,991 | 12/1968 | Yoshimura . | |
| 3,494,244 | 2/1970 | Wayland . | |
| 3,514,815 | 6/1970 | Evans . | |
| 3,518,727 | 7/1970 | Eberle et al. . | |
| 3,534,780 | 10/1970 | Hockmeyer . | |
| 3,572,191 | 3/1971 | Bannies . | |
| 3,592,428 | 7/1971 | McFarlane . | |
| 3,600,027 | 8/1971 | Noland . | |
| 3,619,913 | 11/1971 | Albrecht . | |
| 3,620,896 | 11/1971 | Glasgow . | |
| 3,633,787 | 1/1972 | Katz . | |
| 3,648,404 | 3/1972 | Ogsbury et al. . | |
| 3,653,099 | 4/1972 | Hoffman | 24/16 PB |
| 3,654,052 | 4/1972 | Rye . | |
| 3,686,718 | 8/1972 | Brumlik . | |
| 3,735,449 | 5/1973 | Rosales . | |
| 3,808,648 | 5/1974 | Billarant et al. . | |
| 3,808,649 | 5/1974 | Ausnit . | |
| 3,900,652 | 8/1975 | Uraya et al. . | |
| 4,073,090 | 2/1978 | Lucia . | |
| 4,169,303 | 10/1979 | Lemelson . | |
| 4,290,174 | 9/1981 | Kalleberg . | |
| 4,322,875 | 4/1982 | Brown et al. . | |
| 4,502,194 | 3/1985 | Morris et al. | 24/306 |
| 4,557,024 | 12/1985 | Roberts et al. . | |
| 4,674,778 | 6/1987 | Ruiz . | |
| 4,727,659 | 3/1988 | Walker | 24/16 PB |
| 4,872,242 | 10/1989 | Allan . | |
| 4,910,362 | 3/1990 | Kinner . | |
| 4,947,525 | 8/1990 | Van Erden . | |
| 5,070,584 | 12/1991 | Dais et al. | 24/587 |

CONNECTOR APPARATUS

This application is a continuation-in-part of Ser. No. 553,258 filed Jul. 16, 1990, now U.S. Pat. No. 5,088,162.

This invention is a refinement or improvement of the generally looping, strap-like connector of U.S. Pat. No. 4,872,242, which discloses a flexible, strap-like connector wherein randomly cut lengths of one end of the connector could be nested into and gripped by the C-shaped cross section of the opposite end of the connector.

FIGS. 1 and 11 of that patent disclosed a generally round, split, tubular connector which could be manufactured in a diameter similar to a string, cord or lightweight rope. Those connectors could connect without the need of a knot. The connection would not have the bulk of a knot, which would be desirable in certain applications. The connector could easily be peeled apart at the point of connection in order to tighten or loosen the connector more readily than if a knot was used.

A major and unique advantage of the connector would be that the connection can be accomplished at an random point along the longitudinal length of the connector; however, lateral connection would require precise alignment.

Currently, the only non-adhesive connector which allows a longitudinal and lateral random connection is a hook and loop-type connector, sometimes marketed under the name "VELCRO". Hook and loop connectors do not lend themselves to string, cord or lightweight rope applications. Typically, most hook and loop applications involve repeated connections wherein the connector is connected, more or less randomly, longitudinally and laterally, at the same point. Ease of connection is facilitated because precise alignment and manipulation are not required.

In most applications, the purpose of the hook and loop connectors is primarily to control longitudinal movement in one direction An equally strong connection is provided in all directions but is unnecessary. Increased shear strength in the required direction may necessitate more surface area of hook and loop connector than desirable Shear strength of hook and loop-type connectors can be improved by increasing the diameter and strength of the hooks and/or loops; however, the greater resistance to disconnection for many consumer applications would not be desirable. Moreover, for many applications, accidental connection is unavoidable and undesirable Hook and loop connectors do not work well with certain looping materials, such as sweaters, as they may be accidentally connected with the material. Additional problems would be that they could be fouled with lint and fibers, and weaken too quickly with use. Because of these and other reasons, zippers, buttons, snaps, buckles, hooks, etc., are the connectors of choice for many applications.

There is need for reliable, easily produced, extruded or molded, strong connectors of the types hereinafter described which are reusable, longitudinally and laterally adjustable, have greater shear strength per square inch than hook and loop connectors, are easily disconnected, do not tend to accidentally connect, do not have hooks which could accidentally hook on to loop material, or collect lint or fibers, and which provide an improved alternate method of connection for certain applications

SUMMARY OF THE INVENTION

Some versions of the connector claimed by U.S. Pat. No. 4,872,242 consisted of two specialized parts: one part C-shaped cross section would nest the other part C-shape. Similarly, the connector disclosed herein typically would also have two specialized parts; however, one typically would have a series of specialized C-shaped cross sections, and the second a series of ridges shaped to nest into and be held by the C-shaped cross sections. The portions of the connector to be nested, as disclosed herein, may consist of one, two or more ridges which may be positioned on the connector to skip every 2nd, 3rd, or more C-shaped cross section of the first connector part, so that the C-shaped cross sections may flex open without interference from the adjacent cross sections during connection. Also, only one or a few ridges may be needed to insure adequate shear strength or inversely only one or a few C-shaped cross sections on a connector part may be needed to connect to a connector with a series of ridges.

The C-shaped cross sections may be 1/12 inch or smaller, and up to one inch or larger in diameter, depending on the desired application. A wide variety of multi C-shaped connectors is possible. For instance, it would be desirable to be able to randomly place displays or other objects on decorative wall systems made from wood, metal or other generally inflexible material. If a wall system had a series of C-shaped, generally inflexible, cross sections or ridges, and the object to be mounted was connected to a connector with flexible C-shaped cross sections or flexible ridges, random mounting would occur.

For certain applications, it would be desirable if a two-part connector were made of metal. If one or both parts of a connector were made of a relatively thin gage of stainless steel, sufficient to allow flexing and nesting of a connector part, a metal connector, as hereinafter disclosed and claimed, is possible.

A connector which has found considerable use is the NYLON bundle tie. These connectors typically may be ¼" wide by 6¼ long and used for many types of connections besides connecting bundles of wires. When connected, bundle ties often have relatively long, unused portions which maybe cut off and wasted. Bundle ties allow random longitudinal connection once the end of the tie has been inserted into and pulled through the buckle.

With the C-shaped strap of the prior patent, opposite ends could be pulled together, then nested. With certain applications, greater tension and tightening can be achieved if there is a hole in the body of the strap large enough for the insertion and pulling through of the opposite strap end, with the hole flexed further open and with application of leverage.

Some shoes have hook and lope-type straps. Typically, these straps run through a rectangular metal loop which allows for less shear strength of the connector while at the same time allowing the simultaneous pulling together of both sides of the shoe opening. For certain applications, it is advantageous to have the connector strap not double back upon itself through the metal loop, but simply connect one side of the shoe to the other if sufficient tightening and pulling together of the shoe opening and shear strength can be achieved.

Many types of casual pants and shorts ar connected by the use of metal hooks, buttons and zippers. No adjustment of waist size is normally possible. To partially overcome this problem, elastic material is sometimes used in the waist band. For some types of pants and shorts, belts are used to adjust tightening; however, belts are not appropriate for many articles of clothing, such as tennis shorts. Specialized versions of the connector hereinafter claimed would allow adjustment to pants and shorts presently not practical with other types of connectors.

There is a need for easily produced, multi-circuited electrical connectors which are usable and have longitudinal and laterally adjustable circuits which would allow transistors and other electrical components to be easily connected to a desired circuit. If a single C-shaped connector is provided to have two or a series of electrical circuits on the inside of the connector's C-shaped cross sections, and a C-shaped connector with circuits on the outside, with electrical leads or components attached thereto were inserted, the desired circuits could be connected.

The connector can be virtually as simple as a modified extension cord with two electrical circuits and with the ability to be tapped into at any random point. A somewhat different type of connector can, for instance, be essentially a three-dimensional circuit board. It would be inflexible and have ten parallel C-shaped cross sections, each with 10 parallel circuits, for a total of 100 parallel circuits. Also, the nesting and gripping ability of the connector would allow many connections without the need of solder. Single C-shaped or multi-ridged, or C-shaped connectors, each with desired circuits or components, can be used with multi C-shaped connectors functioning as circuit boards.

A major object of the invention is to provide connectors meeting the above needs, which not only allow random longitudinal connection, as claimed in U.S. Pat. No. 4,872,242, but random lateral connection, the two part basic connector consisting of:

a) a flexible, lengthwise elongated, strap-like body having a series of generally C-shaped cross section grooves in plains perpendicular to, or parallel with, the length dimension of the body; and b) a flexible, lengthwise elongated, strap-like body having a series of generally C-shaped ridges conformed to nest into and be held by the C-shaped cross section of the aforementioned strap.

It is an object of this invention that the ridges be a modified filled-in C-shape in cross section or alternately, hollow open and C-shaped where connected to the strap or hollow and closed.

It is another object of this invention that the walls of the C-shaped cross sections may be flexible.

It is another object of this invention that the walls of the C-shaped cross sections may be inflexible.

It is another object of this invention that the ridges of the connector may be flexible.

It is another object of this invention that the ridges of the connector may be inflexible.

It is another object of this invention that a two-part connector may have a first part with flexible walls of the C-shaped cross sections combined with a second part of the connector with generally inflexible ridges.

It is yet another object of this invention that a two-part connector may have a first part with inflexible walls of the C-shaped cross sections combined with the second part of the connector with generally flexible ridges.

An additional object of the invention would that external and/or internal teeth may be provided which may be spaced at right or sloping angles to the length dimension of the C-shaped grooves, the teeth configured and projected to mesh together (as into valleys between other teeth) or holes through the body of the connector placed alternately between the teeth, when the connector parts were nested.

It is an additional object of the invention that the height of the teeth would be less than 50% of the interior dimension of the C-shaped cross section so that if the teeth do not align with the holes through the body and/or with the valleys during nesting, allowing only partial nesting, any longitudinal movement of the partially nested C-shaped ridges would allow the pinching action of the C-shaped cross sections to fully nest the C-shaped ridges and mesh the teeth into the valleys when teeth and hole or valley alignment occurred.

It is an additional object of the invention that an upwardly rounded portion of a connector occur where two C-shaped cross sections connect, as opposed to say a flat connection, so as to guide and align the rounded ridges into the C-shaped cross sections when two connector parts are more or less randomly pressed together.

It is an additional object that the teeth may be dovetailed to allow improved meshing and holding. Alternately teeth may slope to allow improved meshing in one direction and slipping of the teeth in the other direction in order to allow tightening without disconnection.

It is an object of the invention that the connector could be produced with the approximate thickness, width and flexibility of hook and loop-type connector.

It is an additional object of this invention that a wall system made of wood or other non-flexible material can be manufactured with C-shaped cross sections that allow the mounting of objects by the use of flexible ridges or C-shaped connectors.

It is an object of this invention that multiple C-shaped connector be made of relatively thin stainless steel or other metal of a gage sufficient to allow flexing and nesting.

It is an additional object of the invention that the connector be produced approximately ⅛ to ¼ inch wide, so as to provide an alternate type connector to synthetic resin bundle ties.

It is an object of the invention that the connector be incorporated into a specialized shoe connector not needing shoe laces or hook and loop-type connectors which allow a shoe to be firmly tightened or loosened more easily than currently possible.

It is an object of this invention that the connector be incorporated into a specialized pants connector allowing connection and waist adjustment without the use of zippers, hooks, buttons, hook and loop connections, or elastic. In this regard, it is an object of this invention that the C-shaped channels of a connector part may be angled to align on a radial point.

It is an additional object of this invention that the single C-shaped connector, as defined for example in claim 1, U.S. Pat. No. 4,872,242, have a hole through its body wherein the hole is larger than the diameter of the C-shaped body when inserted into the hole.

It is an object of this invention that there can be one or more electrical wires or strips on the interior of one or more C-shaped channels, in which, if a C-shaped connector or ridge with electrical wires or strips on the exterior were nested into the channel(s), an electrical connection would occur.

It is an additional object of this invention that precise alignment of the electrical wires or strips can be achieved by having a hole or recess in one connector part, and a ridge in the other connector part which would fit into such recess to control alignment.

It is an additional object of this invention that precise alignment of the electrical wires or strips can be achieved by having one or two flanges on a ridge or C-shaped connector which, when nested, would allow the flange or flanges to rest on the upper edge or edges of the nesting C-shaped connector sides.

It is an object of this invention to provide a pull, labeling or fastening tab to be added to the end of an approximately two inch to six inch connector, connector, the tab having a width wider than the connector and a hole configured to have the connector threaded through it so that the connector can loop back and connect to itself. One side of the connector can then loop and connect to the same side or the opposite side.

It is an object of this invention that the connector be capable of being sewn onto NYLON strips used for backpacks, suitcases, sports equipment, and the like.

It is an object of this invention that the connectors be capable of being made into general utility straps, with ridges, and/or with a C-shaped cross section or recess on both sides of the strap, which are capable of holding in two directions.

Certain aforementioned embodiments are configured to provide maximum shear strength in one direction with a minimum number of ridge insertions, for ease of connection; however, they may not hold if incorrectly used as a strap, i.e., if connected backwards. To remedy this, it is an object of the invention that walls of a series of adjacent C-shaped cross sections be configured to function as ridges s that one side of a connector strap can loop over and connect to itself.

It is an object of the invention that one version of the connector consist of a series of C-shaped cross sections or recesses on both sides of a strap, at least one side having alternating larger and smaller C-shaped cross sections, the smaller configured outside walls of a plurality of ridges.

It is an additional object of the invention that a strap-like version of the connector be configured to allow a degree of elasticity.

It is yet a further object that a C-shaped connector be housed in a buckle to be used in conjunction with a flattened tongue-like ridge, configured to allow ratchet controlled adjustable advancement. Often with backpacks, tote bags, and the like, there are buckles which are pinched to allow disconnection. Typically, since that type of buckle is not adjustable, an alternate method is needed to tighten or loosen a strap. The C-shaped connector of the present invention can be housed in a buckle to be pinched through openings in the side of the buckle housing, thus flexing the C-shaped cross section upwards in order to extract a ratchet tooth from the tongue.

It is a further object of the invention that certain connector ridges need not nest or contact both sides of a C-shaped cross section to achieve interlock, but that a plurality of ridges be configured to do so. In this regard, it is understood that portions of certain side walls of ridges may be curved, straight angled or parallel, or a combination of the above, so long as plurality of ridges achieve complete interlock of the connector.

These and other objects and advantages of the invention, as well as the details of an illustrative embodiment, will be more fully understood from the following specification and drawings, in which:

DETAILED DESCRIPTION

Figures 1, 2:
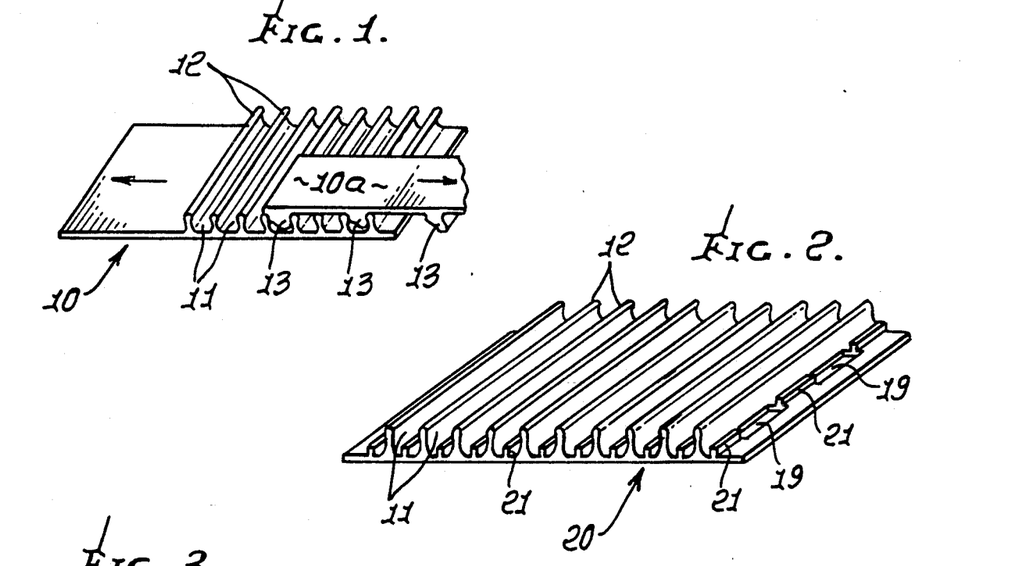
FIGS. 1-26 show various forms of the invention.

Note in FIG. 1 the flexible, lengthwise elongated body 10 in the form of a thin strip or web of material having one or more recesses 11, with typically multiple and generally C-shaped cross sections, the recesses extending laterally and spaced apart longitudinally. They are formed by upright, parallel, cantilever walls 12 integral with body strap 10. The connector also has body or web extend 10a carrying one or more lateral ridges 13 parallel to the recesses, and configured to nest into and be gripped by the walls of certain recesses, such cantilever walls deflected or spaced (expanded) by the inverted ridges. One or more such ridges are fitted into one or more of the recesses, to form a connector; and web 10a may be connected to web 10, i.e., looped back over the latter, as shown. The ridges and walls may be extended laterally or longitudinally; and the ridges 13 may have C-shaped terminals insertable into C-shaped recesses formed by the walls 12; thus, the walls may narrow near their junctions with web 10; and the ridges 13 may narrow near their junctions with web 10a.

It is another feature that two or more ridges are spaced so that when engaged into the C-shaped cross sections, one or more C-shaped cross sections would not be engaged between the ridge so that the C-shaped cross sections can flex during engagement and/or disengagement. See FIG. 1. This permits a high degree of adjustability.

In FIG. 2, the connector 20 is like that of FIG. 1, but has teeth 21 in the recesses designed primarily to control movement in one or two directions parallel with the C-shaped channels. Walls of the C-shaped channels may be flexible or inflexible. See also slots 19 in web 20, arranged so that the slots alternate longitudinally with the teeth in the recesses. This adds to flexibility of the web 10.

Figures 3, 4:
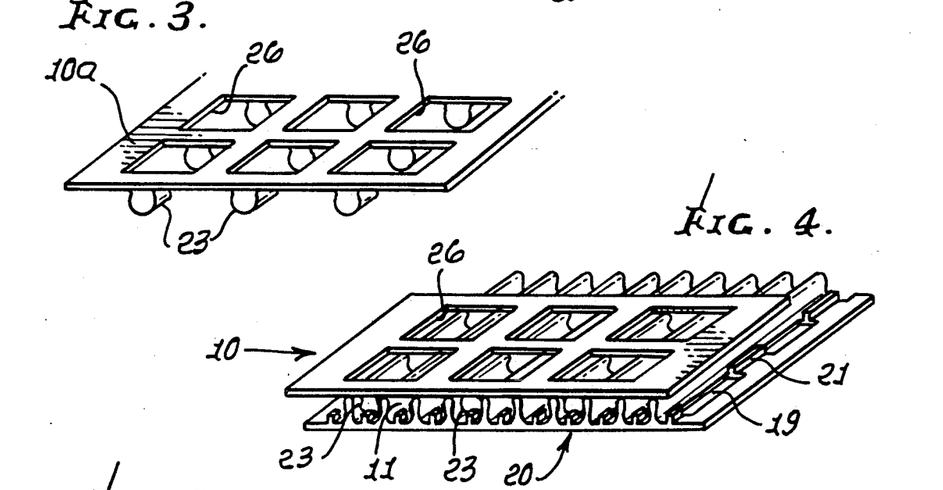

In FIG. 3, holes 26 are provided in the web 10a that carries the ridges 23. The ridges and holes alternate, longitudinally, as shown. Thus web 10a is quite flexible Holes 26 extend in longitudinal rows, and modified ridges 23, in sections, extend in longitudinal rows.

FIG. 4 shows the modified ridges of FIG. 3 nesting in the modified recesses of FIG. 2.

Figure 5:
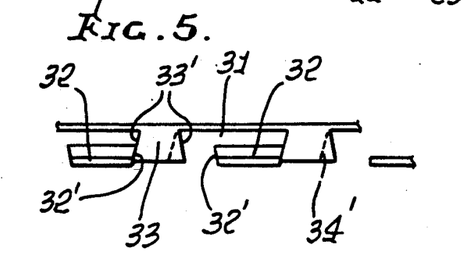

FIG. 5 shows a modified ridge 33, which is dovetailed, in cross section It fits with C-shaped recess 31, between teeth at 32, with walls at 32'. Spacing between successive ridge surfaces at 33' is slightly less than spacing between successive walls at 32', so that interference fit is provided and wall spread occurs, as does interlock. An alternate ridge surface may be provided at 34' to allow ridge 33' to be adjusted longitudinally in recess at 31 and longitudinally ride over teeth at 32 to next recess at 31' without disengagement of connector parts.

Figure 6:
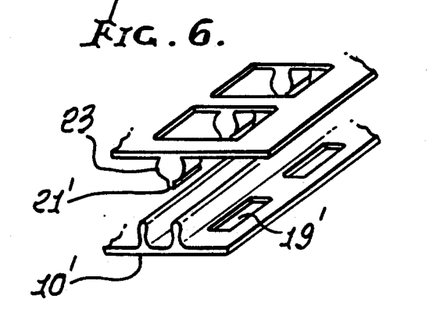

In FIG. 6, the design is like FIGS. 2-4, except that teeth 21 are modified to the form 21', integral with the bottoms of ridges 23. Those teeth 21 ' engage the slots at 19' in web 10'.

Figure 7:
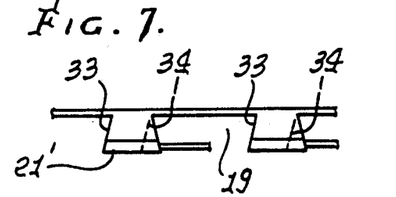

FIG. 7 shows dovetailed ridges with dovetailed teeth 21' meshed into openings 19 at bottoms of C-shaped openings. Alternate ridge with tooth surface 34 allow connector adjustment in one direction without connector disengagement.

Figure 8:
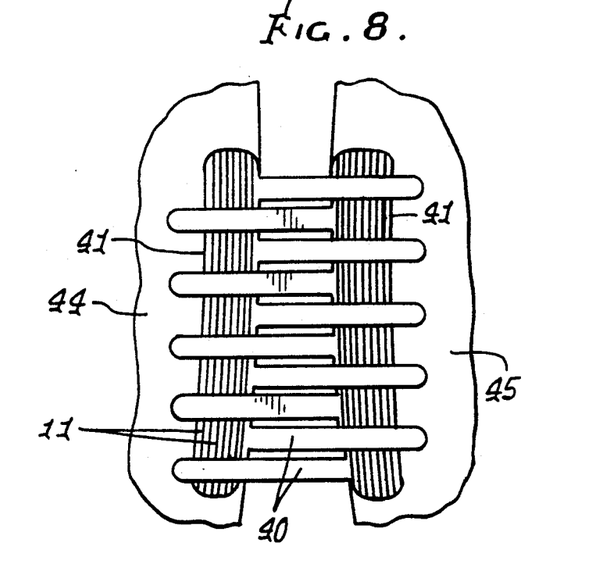

FIG. 8 shows a specialized connector used on a shoe, to replace laces. Note opposite alternate tongues at shoelace eyelet locations 40 (like webs 10a) carrying ridges at their underside (like ridges 13), which interfit into recesses 11 on two spaced parallel straps 41, like webs 10. The tongues 40 extend laterally, and the straps 41 extend longitudinally. Each strap carries tongues, as shown, and the straps are integral with left and right "uppers" 44 and 45, as shown.

Figure 9:
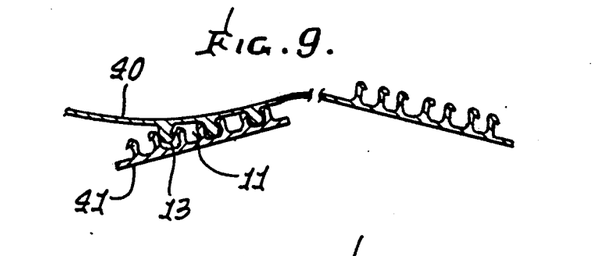

FIG. 9 is an enlarged cross section taken on FIG. 8. Alternate connector at FIG. 1 may be used.

Figure 10:
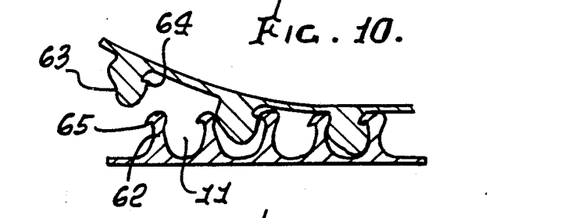

FIG. 10 is an enlarged view showing modified ridges 63 receivable in modified recesses 61 formed by modified walls 62. The ridges have hook shape in cross section at 64 to hook under edges 65 formed by the walls 62. Connectors using hooks primarily control longitudinal movement in one direction plus vertical movement. Disconnection of connector parts requires peeling up of connector part (with ridges) on side opposite hooks. Connection is improved by asymmetric ridges narrowing to a point furthest from the strap.

Figure 11:
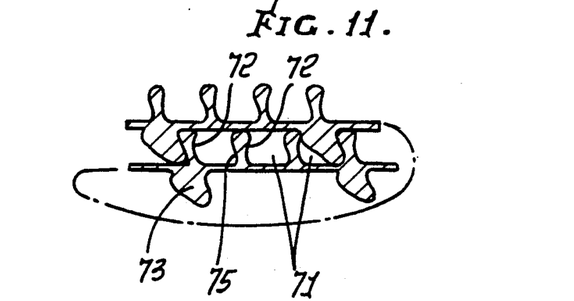

In FIG. 11, the modified ridges 73 are asymmetric and offset to exert shear pressure or force on the bases 75 of the side walls 72 defining the recesses 71 into which the ridges fit. Connectors using these modified cross sections primarily control longitudinal movement in one direction. Note lengthwise regular locations of the ridges and recesses or channels, all on the same web or strap. Disconnection of ridges 73 from C-shaped channels 71 is simplified, requiring pulling apart rather than peeling apart required for connector with hooks, as in FIG. 10.

Figure 12:
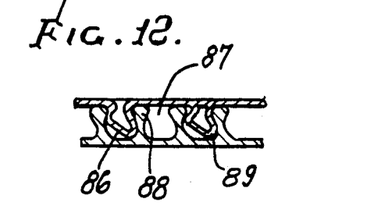

FIG. 12 shows a further modification similar to that of FIG. 11. See ridges 86 and 87, recesses 87, and walls 88. Ridges with these modifications allow inflexible walls 88.

Figure 13A:
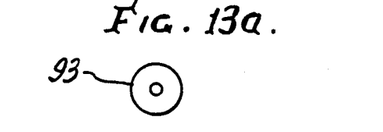
Figure 13B:
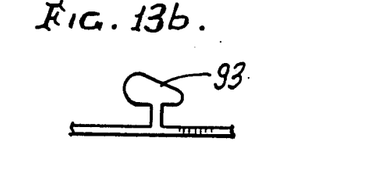

FIG. 13a is a top view of a mushroom-shaped ridge 93; and FIG. 13b shows a side view of the ridge 93. It fits in a recess as previously disclosed.

Figure 14A:
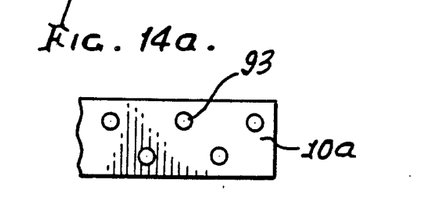
Figure 14B:
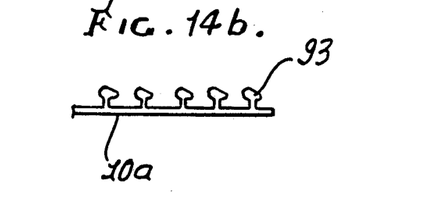

FIGS. 14a and 14b are plan and elevation views of a web 10a carrying multiple mushroom-shaped connector parts.

Figure 15:
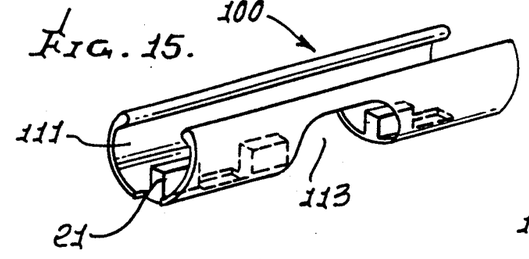

FIG. 15 shows a strap or web 100 with a C-shaped recess 111, having a bottom hole 113 sized to allow thread-through of another section of the strap.

Figure 16:
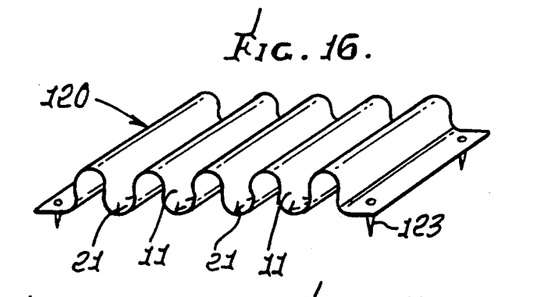

FIG. 16 shows an undulating web 120 (corresponding to web 20, FIG. 2) forming recesses 11, as previously disclosed. Walls are defined by the web itself. Teeth 21 are located at the recess bottom, as in FIG. 2. The strap or web 120 may consist of stainless steel. See also screw connectors 123.

Figure 17:
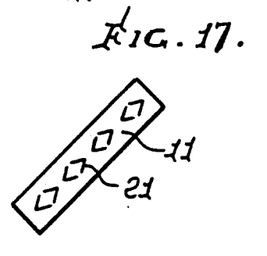

FIG. 17 is a top view of one connector channel 11 (as in FIG. 16) showing V-shaped teeth 21 designed to control ridge movement, in two opposite longitudinal directions. Successive teeth taper in opposite directions.

Figure 18:
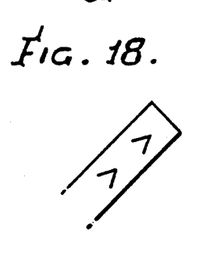
Figure 19:
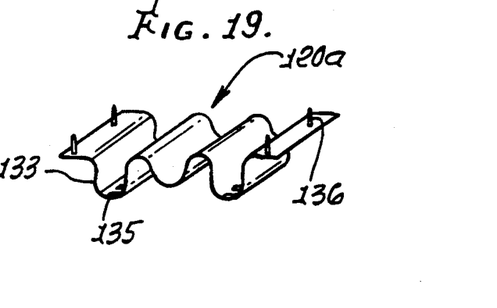

In FIG. 18, this alternate tooth design shows tooth taper in one direction, to allow ridge connector at FIG. 19 adjustment in one direction.

FIG. 19 shows an undulating web 120a (corresponding to web 10a FIG. 19) defining ridges 133 formed to enter recesses 11 in FIG. 16. Slots 135 fit over or engage the teeth 21.

Figure 20:
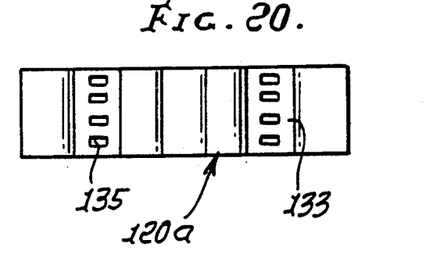

FIG. 20 is a top plan view of the FIG. 19 web and slots 135. See fasteners 136 in FIG. 19. Teeth at FIG. 17 and FIG. 18 may alternatively be used on the bottom of the ridges 133 of FIG. 19 to engage teeth 21 of connector at FIG. 16.

Figure 21:
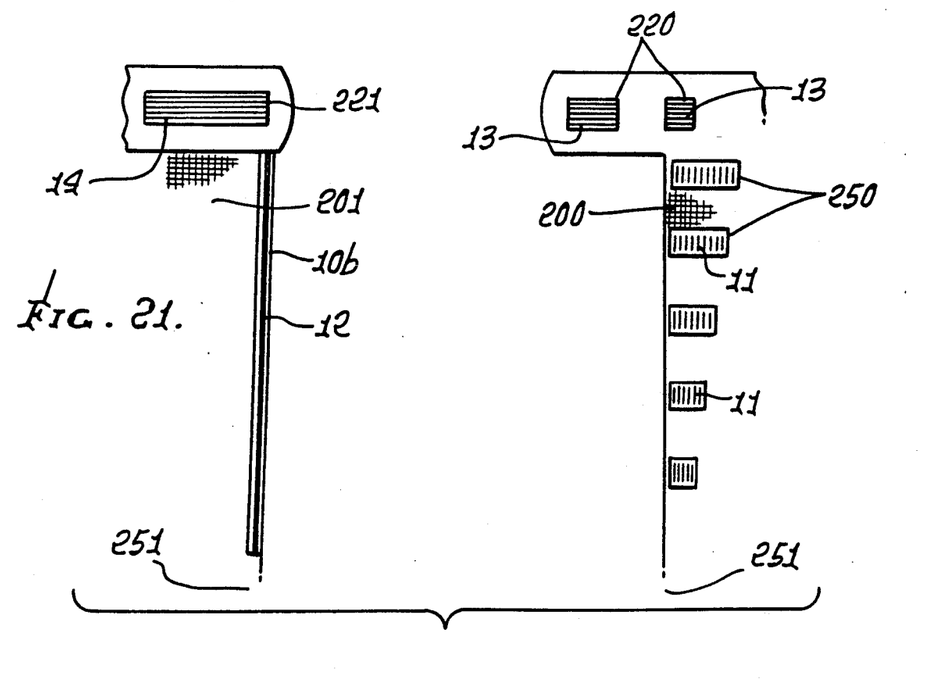

FIG. 21 shows application of the invention to a pant connector. See pant right section fabric 200 carrying spaced sections 250 of web 10 in FIG. 1 (as at button locations), that web carrying recesses 11, as in FIG. 1. Recesses 11 are angled to align with common point 251. Pant left section fabric 201 carries one elongated web 10b (like 10b in FIG. 1) that carries ridges 12 to enter recesses 11, as described above, when pant section 201 rotates at common point 251 and is adjustably interconnected in lapping relation with pant section 201. Vertical ridges and recesses then prevent lateral or sideward separation of the pant sections. See also spaced sections 220 of connector 10, as in FIG. 2 carrying horizontal C-shaped channels 13, on pant section 200, to adjustably receive horizontal ridges 14 of connector 221 as in FIG. 3 on pant section 201. Connector 221, with alternate sloping ridge surface at 34; FIG. 5 allows first the connection to connector 220, then horizontal tightening of pant sections 200 and 201, then the connection of the connector at 10b to spaced connector sections 250. After connection, pant section 200 would be on the outside.

Figure 22:
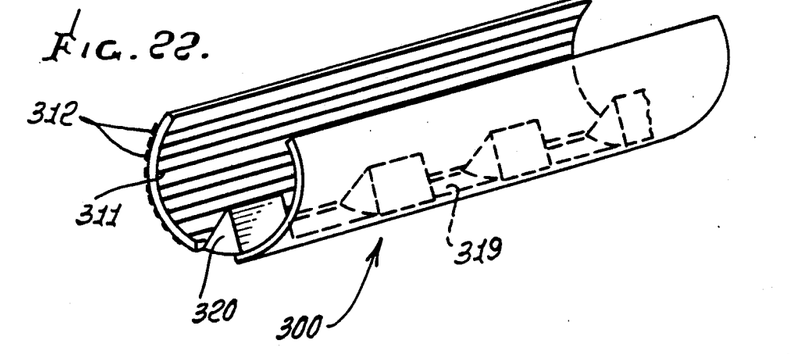

FIG. 22 shows a C-shaped web 300 (corresponding to web 100 in FIG. 15) with recesses formed by longitudinal metallic, electrical current strips 311 on the interior of the C-shaped channel. Parallel strips 312 are spaced about on the outside of the web, and extend longitudinally, as does the web 300. Those recesses receive corresponding metallic strips 312 on a web 300, like 10b, when the two are nested together, forming circuit interconnection. Internal teeth 320 on the web 300 interlock with holes 319 in the web 300 to control rotational and lengthwise relative movement of the nesting webs.

Figure 23:
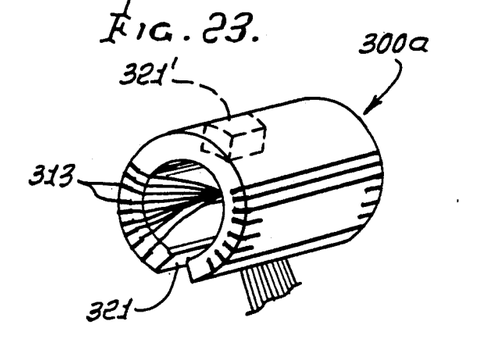

FIG. 23 shows the C-shaped web 300a with external electrical strips at 313, like ridges 13 of FIG. 1, sized to nest into web 300 of FIG. 22. Strips at 313 are aligned to engage strips 311 of web 300 when opening 321 nests over teeth 320. Alternate opening 321' may be used to engage tooth 320.

Figure 24:
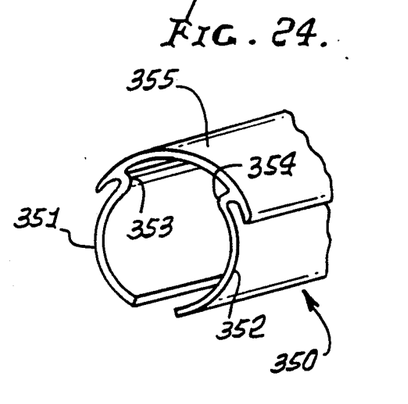

FIG. 24 shows a C-shaped cover 350, to fit over and protectively cover the web 300 of FIG. 22. Note walls 351 and 352 hinged at 353 and 354 to carrier wall 355. Items 300 and 300a may consist of insulative plastic material.

Figure 25:
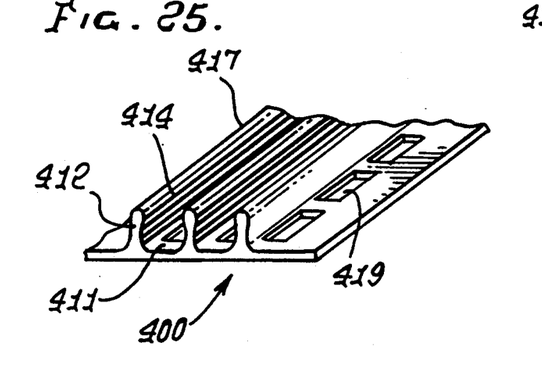

FIG. 25, like FIGS. 1, 2 or 6, shows a connector 400 having a series of metallic electrical circuit strips 414 on the walls 412 that form the recess 411. Strips 414 extend lengthwise of the recesses or channels.

Figure 26:
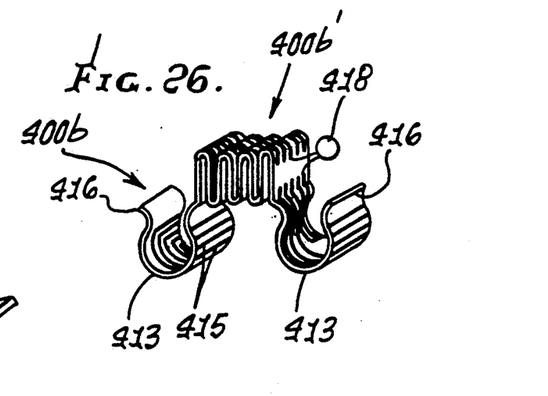

FIG. 26 shows a nesting connector part, or web 400b, like 10b in FIG. 1, or 120a in FIG. 19, with electrical circuit strips 415 on the undulating ridges 413. Strips 415 are engageable with the strips 414 in FIG. 25, when ridge 413 interfits recess 411. Expansion part 400b allows alternate channel 411 engagement. Flange 416 connects with top of C-shaped channels 417 of FIG. 25 to align circuit strips 414 and 415. Circuits 414 of FIG. 25 143 connected to 414 circuits of another 411 channel when connector part at FIG. 26 is nested into selected channels and the desired circuit strips are interconnected by one or more electrical components 418. Connector at FIG. 26 may have one or multiple circuit strips 415. Connectors at FIG. 22 and FIG. 23 may alternately be used with connector at FIG. 25.

Figure 27:
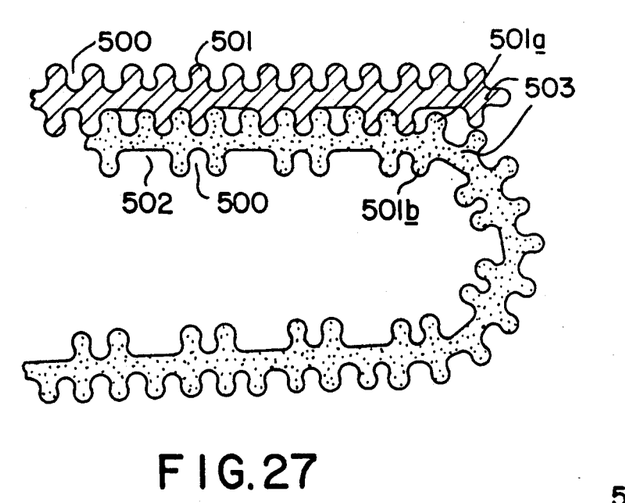
FIG. 27 is a side view of another connector strap, and taken on lines 27—27 of FIG. 29.
Figure 29:
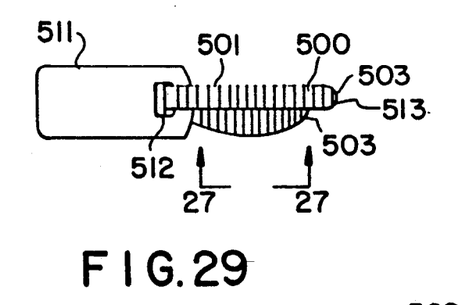
FIG. 29 is another view of the FIG. 27 connector associated with a tab.

FIG. 27 is an enlarged partial view of the connector strap 503 of FIG. 29, taken on lines 27—27. The C-shaped cross section openings 500 are the approximate sizes, i.e., dimensions, as the ridges 501 in size view. The large C-shaped cross section openings 502 on the opposite side of the strap have length dimensions equal to three of the openings 500 or three of the ridges 501. Thus each nesting of the ridge or ridges allows at least one ridge to flex just proceeding final nesting. Such connectors may, for example, consist of molded plastic material.

Figure 28:
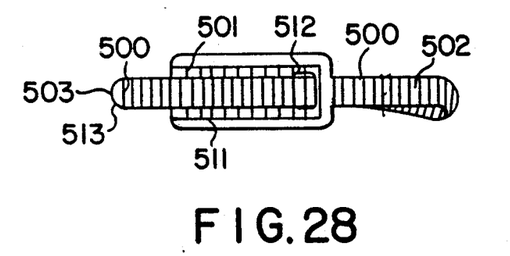
FIG. 28 is a top plan view showing the FIG. 27 assembly associated with a tab.

In FIGS. 28 and 29, the connector 503 has a tab 511 with a hole 512 configured to pass the connector strap 503 so as to allow the strap end 513 to be pulled in one direction, while the tab 511 is pulled in the opposite direction, to maximize tightening. FIG. 29 shows the bottom side of the connector of FIG. 28. The connectors of FIGS. 28 and 29 may alternately use various C-shaped cross section configurations.

Figure 30:
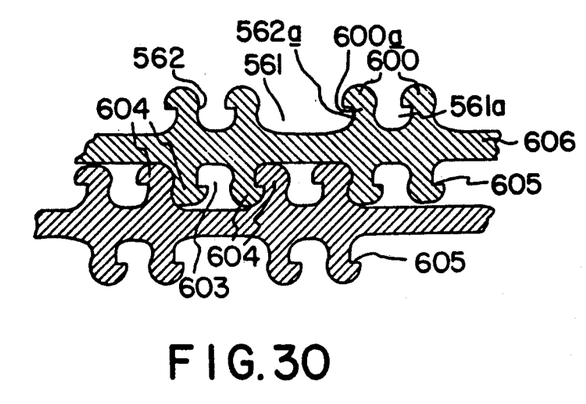
FIG. 30 is an enlarged view showing modified connector strap interconnection.
Figure 31:
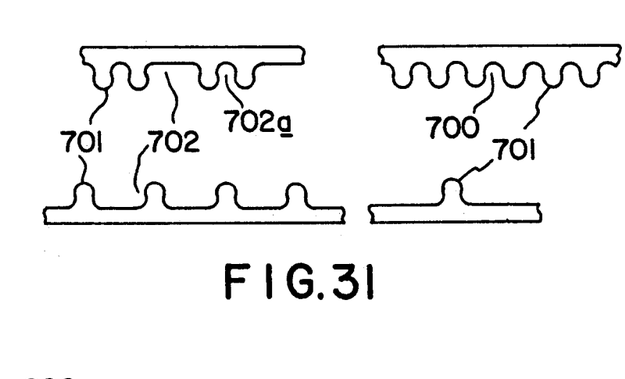
FIG. 31 is a view showing modified C-shaped recesses and associated ridges.

FIG. 30 shows modified ridges 600 which are similar to the ridges 63 of FIG. 10; however, they have been narrowed at 600a to allow some flex, and merged with the side walls 562 and 562a of the C-shaped recesses 561 and 561a. Like the C-shaped cross section openings 61 of FIG. 10, certain C-shaped cross section openings 603 of FIG. 30 are unoccupied to allow flexing of certain ridges 604, just prior to final nesting, where two lengths of the connector are joined. The hooks 605 function like the hooks at 64 and 65 of FIG. 10. It is understood that a connector may be configured with hook surfaces 605 parallel with the connector body 606, or not parallel to that body, or a connector may have a greater or lesser number of hooks in combination with ridges FIG. 31 shows examples of possible sizes (lengths) of C-shaped recesses or openings 700, 702 and 702a with ridges 701 of the same dimensions as 700 and 702a. It is understood the ridges 600 of FIG. 30 may be substituted for the ridges 701 of FIG. 31, and that the hooks 605 may be orientated in one, two or both directions.

Figures 32, 34:
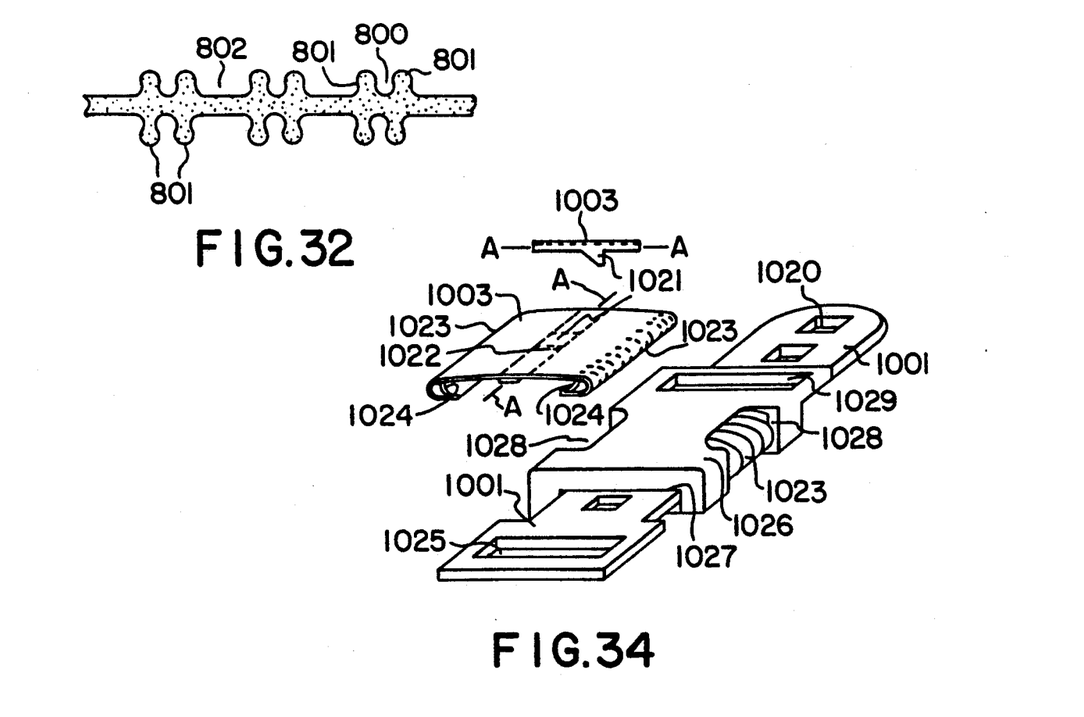
FIG. 32 is a view showing different sized C-shaped openings on a connector.
FIG. 34 is shows a modified connector with a tooth, said connector also placed within a buckle-like housing; also shown is a modified flat, tongue-like ridge with holes to receive said tooth.

FIG. 32 shows a preferred embodiment of alternating larger C-shaped openings 802 and standard C-shaped openings 800. A C-shaped cross section recess 800 and two adjacent ridges 801 are sized to nest into a larger C-shaped opening 802 upon randomly press filling of the connector lengths together. Alternately, a single ridge 801 will nest into a standard C-shaped opening 800 while the ridge common to the same C-shaped standard opening 800 will nest in an adjacent larger C-shaped opening 802.

Figure 33:
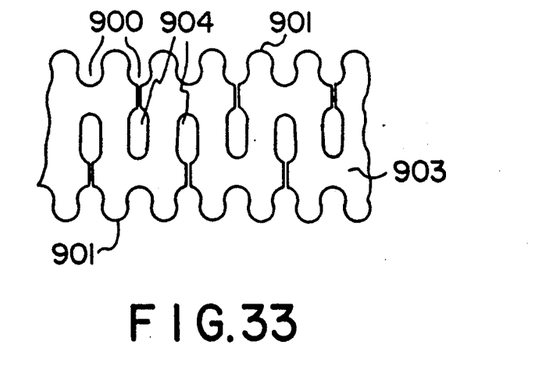
FIG. 33 shows a connector connecting C-shaped recesses, ridges and openings.

FIG. 33 shows modified connector body 903 with ridges 901 of one connector length configured to nest in C-shaped openings 900 in another connector length. Slots 904 have been provided in body 903 to intersect openings 900 to allow elastic-like, lengthwise elongation of the connector body 903. It is understood that alternate elastic means may be used, or alternate ridge types, including ridges with a plurality of hook-like flanges.

FIG. 34 shows a modified C-shaped connector 1003 configured to nest a generally inflexible, modified, tongue-like ridge 1001 which has holes 1020 configured to receive a ratchet-like tooth 1021 positioned on the inside surface 1022 of the connector 1003. View A-A is broken out to show tooth 1021. The connector 1003 is flexible, and when compressed on the outside walls 1023, will flex so as to upwardly disengage the ratchet-like tooth 1021 out of the hole 1020. Multiple teeth and holes may be used. The C-shaped cross section body 1003 has flanges 1024 configured to guide and nest the tongue 1001. The tongue 1001 has an opening 1025 configured to connect to a flexible strap. The C-shaped cross section has a buckle-like housing 1026 configured to encase the C-shaped cross section 1003 and a guide slot 1027 that receives tongue 1001. The housing 1026 has side openings 1028 configured to allow manual compression of C-shaped connector 1003. The housing 1026 also has a slot 1029 configured to connect to a flexible strap.

Accordingly, the connector of the invention basically provides:

a) a body having generally flexible, C-shaped cross section means defining recess means in planes crosswise of and normal to a major dimension of the body, b) the body having a base and a succession of side walls together defining the C-shaped recess means, each side wall having a mid-section and an outer side wall portion, the mid-section being sufficiently narrow to allow the upper side wall portion to flex, c) the side walls having inverted C-shaped termini relative to the C-shaped recess means, d) and a ridge means configured to nest in and be gripped by the side walls of certain of the recess means, e) the ridge means fitted in the certain C-shaped recess means to form the connector.

Means to confirm complete adjusted interlock of the ridge means in the certain C-shaped recess means may also be provided.

I claim:

1. A connector comprising
 a) a body having generally flexible, C-shaped cross section means defining recess means in planes crosswise of and normal to a major dimension of said body,
 b) said body having a base and a succession of side walls together defining said C-shaped recess means, each side wall having a mid-section and an outer side wall portion, said mid-section being widthwise narrower than said outer side wall portion and sufficiently narrow to allow said outer side wall portion to flex, relative to said mid-section,
 c) said side walls having inverted and rounded C-shaped termini relative to said C-shaped recess means,
 d) and a ridge means configured to flexibly fit in and be gripped by the side walls of certain of said recess means, said ridge means fitting against said narrowed mid-sections, and a web integral with said ridge means and extending across said outer side wall portions, e) said ridge means being fitted in said certain C-shaped recess means to form said connector, f) and including means to confirm complete adjusted interlock of said ridge means in said certain C-shaped recess means, g) said recess means including C-shaped recesses and said ridge means including ridges, wherein certain C-shaped recesses are configured to each nest a single ridge, and wherein other C-shaped recesses are configured to nest a plurality of ridges.

2. The combination of claim 1 wherein said ridge means is integral with said side walls.

3. The connector of claim 2 including teeth thereon to control movement of said ridge means within said C-shaped recess means.

4. The connector of claim 2 wherein there are electrical conductors on the interior surfaces of the C-shaped recess means.

5. The connector of claim 2 wherein there are one or more elongated reinforcement elements within or on the connector.

6. The combination of claim 1 wherein there are hook-like flange means on the interior side walls of said recess means and flange means on the ridge means, said flange means to confirm said complete adjusted interlock when said certain C-shaped ridge means is nested in said certain C-shaped recess means and said flange means overlap.

7. The connector of claim 1 wherein said connector connects portions of a shoe, and including said shoe having said portions.

8. The connector of claim 7 wherein said connector has certain body parts affixed to said shoe, generally in the location of shoelace eyelets, and in combination with other connector body parts shaped as straps which are opposing and offset from each other, so as to allow the simultaneous manual pulling together of the shoe portions with two hands and allowing shoe tightening in a manner similar to that achieved by using shoelaces.

9. The combination of claim 2 wherein there are hook-like flange means on the interior side walls of said recess means and flange means on the ridge means, said flange means to confirm said complete adjusted interlock when said certain C-shaped ridge means is nested in said certain C-shaped recess means and said flange means overlap.

10. The connector of claim 1 wherein said connector connects clothing, and including said clothing.

11. The connector of claim 1 wherein the connector is metallic and the C-shaped recess means and ridge means resemble a series of connected "S's".

12. The connector of claim 11 wherein the C-shaped cross section means are generally inflexible.

13. The connector of claim 11 including teeth thereon to control movement of said ridge means within said C-shaped recess means.

14. The connector of claim 1 wherein said C-shaped cross section means is generally inflexible and wherein said ridge means is generally flexible.

15. The connector of claim 1 wherein there are electrical conductors on the interior surfaces of the C-shaped recess means.

16. The connector of claim 1 wherein there are electrical conductors on the exterior surfaces of the ridge means.

17. The connector of claim 16 wherein the ridge means are generally flexible.

18. The connector of claim 16 wherein the C-shaped recess means are generally inflexible.

19. The connector of claim 1 wherein there are one or more elongated reinforcement elements within or on the connector.

20. A connector comprising
a) the connector of claim 1 wherein said C-shaped cross section means is elongated crosswise,
b) said C-shaped recess side walls configured to nest said ridge means,
c) said ridge means defining a flat, partially flexible tongue means,
d) said tongue means and C-shaped recess means including means to connect to a strap means.

21. A connector comprising
a) the connector of claim 20 wherein said C-shaped recess means is housed in hollow, generally rectangular buckle means,
b) said buckle means including opening means wherein said ridge means is fitted into said buckle means,
c) said buckle means including means wherein said ridge means may extend through said buckle means to allow additional adjustable interlock,
d) and wherein said mean to connect to a strap means is integral with said buckle means.

22. A connector comprising
a) the connector of claim 21 wherein said means to confirm completed adjusted interlock include tooth means,
b) and wherein said buckle means including opening means is configured to allow flexing of said C-shaped recess means so as to adjustably disengage said tooth means.

23. The connector of claim 22 wherein said tooth means comprise ratchet means configured to allow said adjusted interlock without manual flexing of said C-shaped recess means.

24. A connector comprising
a) a body having generally flexible, C-shaped cross section means defining recess means in planes crosswise of and normal to a major dimension of said body,
b) said body having a base and a succession of side walls together defining said C-shaped recess means, each side wall having a mid-section and an outer side wall portion, said mid-section being sufficiently narrow to allow said outer side wall portion to flex,
c) said side walls having inverted C-shaped termini relative to said C-shaped recess means,
d) and ridge means configured to flexibly fit in and be gripped by the side walls of certain of said recess means,
e) and wherein said ridge means is fitted in said certain C-shaped recess means to form said connector,
f) means to confirm complete adjusted interlock of said ridge means in said certain C-shaped recess means,
g) said C-shaped recess means including multiple C-shaped recesses and said ridge means including multiple ridges, and wherein certain C-shaped recesses are configured to each nest a single ridge, and wherein other C-shaped recesses are configured to nest a plurality of ridges.

25. A connector comprising
a) a body having generally flexible, C-shaped cross section means defining recess means, b) said body having a base and a succession of side walls together defining said C-shaped recess means, each side wall having a mid-section and an outer side wall portion, said side walls having termini, said mid-section being sufficiently narrow to allow said side wall termini to flex, c) and a ridge means configured to flexibly fit and be griped by the side walls of certain of said recess means, d) and wherein said ridge means is adapted to be fitted into or removed from certain C-shaped recess means so as to allow a plurality of side wall means to flex and to provide an adjustable connector, e) and including means associated with said base and side walls to confirm complete adjusted interlock of said ridge means in said certain C-shaped recess means, f) and wherein adjacent C-shaped recesses have common side wall mid-sections and upwardly rounded termini configured to flexibly guide unaligned ridge means into said recess means.

26. The combination of claim 25 wherein said ridge means includes at least one ridge.

27. The combination of claim 25 wherein said recess means includes at least one recess.

28. The combination of claim 25 wherein there are hook-like flange means on the interior side walls of said recess means and flange means on the ridge means, said flange means to confirm said complete adjusted interlock when said certain C-shaped ridge means is nested in said certain C-shaped recess means and said flange means overlap.

29. The connector of claim 25 wherein said connector connects portions of a shoe, and including said shoe having said portions.

30. The connector of claim 29 wherein said connector has certain body parts affixed to said shoe, generally in the location of shoelace eyelets, and in combination with other connector body parts shaped as straps which are opposing and offset from each other, so as to allow the simultaneous manual pulling together of the shoe portions with two hands and allowing shoe tightening in a manner similar to that achieved by using shoelaces.

31. The connector of claim 29 wherein said connector is used to compress a bladder within a shoe, and including said bladder.

32. The connector of claim 25 wherein said connector connects clothing, and including said clothing.

33. The connector of claim 25 wherein the connector is metallic and the C-shaped recess means and ridge means resemble a series of connected "S's".

34. The connector of claim 25 wherein said C-shaped cross section means is generally inflexible and wherein said ridge means is generally flexible.

35. The connector of claim 25 wherein there are electrical conductors on the interior surfaces of the C-shaped recess means and electrical conductors on the exterior surfaces of the ridge means, said conductors on said interior surfaces connected with said conductors on the ridge means exterior surfaces.

36. The connector of claim 25 wherein said means to confirm complete adjusted interlock defines a plurality of body elongation means.

37. A connector comprising a) an elongated crosswise flexible, C-shaped cross section means defining recess means, and having side walls, b) and wherein said C-shaped cross section means is configured to nest tongue means, c) and including said tongue means defining the end portion of a strap, and wherein said C-shaped cross section means is housed in a generally rectangular buckle means, d) said buckle means including first opening means wherein said tongue means is flexibly fitted into said recess means, e) said buckle means including second opening means wherein said tongue means may extend through said buckle means to allow multiple, adjustable, releasable, interlock positions of said tongue means and recess means, f) and wherein means is provided to connect to a strap integral with said buckle means, g) and said connection including adjustable releasable tongue lock means, for locking the tongue means in said interlock position, h) said buckle means including third and fourth opening means configured to allow manual flexing of said C-shaped recess means so as to disengage said tongue lock means.

38. The connector of claim 37 wherein said tongue lock means includes ratchet means configured to allow tightening of said tongue means without manual flexing to said tongue lock means.

39. A connector comprising a) a buckle means having recess means, said recess means having tongue lock means, b) said buckle means having a base, a top and side wall means, each side wall means having a mid-section, said mid-section configured to allow manual release or adjustment of said tongue lock means, c) a tongue means defining the end portion of a strap, d) said buckle means including first opening means wherein said tongue means is flexibly fitted into said recess means, e) said buckle means including second opening means wherein said tongue means may extend through said recess means and through said second opening means to allow greater two-way, multiple, adjustable interlock, f) said buckle means including means to connect to a strap, g) and wherein said tongue means is fitted into said buckle means to complete adjustable connection.

* * * * *